United States Patent Office 3,736,190
Patented May 29, 1973

3,736,190
HERMETICALLY SEALED STRUCTURES FOR ORGANIC ELECTROLYTE SYSTEMS
Arabinda N. Dey, Needham, and Robert W. Holmes, Dedham, Mass., assignors to P. R. Mallory & Co., Inc., Indianapolis, Ind.
Filed Mar. 2, 1972, Ser. No. 231,167
Int. Cl. H01m 1/02
U.S. Cl. 136—133    8 Claims

ABSTRACT OF THE DISCLOSURE

A hermetically sealed battery or cell casing is described comprising a casing enclosing the cell or cells and provided with a cover sealed to its casing and having, in addition to sealed electrode and leads, a filling portal for introducing the electrolyte. The filling portal is provided with a resilient primary sealing means at the internal lower portion of the portal for engaging resiliently a male-threaded closure means, said male-threaded closure means being fusibly sealed to the outer and upper portion of the portal.

FIELD OF THE INVENTION

This invention relates to containers and casings for electrochemical energy generators which do not either during storage or use, generate gaseous products. More particularly this invention relates to completely hermetically-sealed containers for such generator systems which are based upon organic electrolytes.

Electrochemical generators utilizing active metal anodes and organic non-aqueous electrolytes have recently come into favor as they have certain notable advantages including high volumetric and gravimetric energy density and they operate at high voltages. The high voltage is possible since the electrolytes utilized are based upon organic liquids which are not below the active metal anodes on the electrochemical series, and consequently the active metal anodes used do not liberate hydrogen therefrom.

A notable advantage for the aforementioned non-aqueous organic electrolyte systems is that they have the unique property of not producing any gaseous products during normal storage and discharge of the cells or composite batteries of such cells. The present invention takes advantage of this property and provides a truly hermetically sealed case for such organic electrolyte batteries.

All the prior aqueous acid and alkali, primary and secondary, dry and wet batteries are known to produce gas on the storage, charge or discharge and consequently such cells and battery casings for such systems must be provided with structures, devices or means for handling such gases to prevent their accumulation within the cell. Such devices include vents, special resilient seals, "catalytic re-combining" surfaces or pellets for the chemical or electrochemical removal of the gases that are generated.

The improved hermetically sealed casing for cells and batteries that is provided by this invention for use with the aforementioned active metal organic non-aqueous electrolyte systems does not require any of the aforementioned gas-handling expedients, thus resulting in considerably simplified and reliable cell structures.

It is an object of this invention to provide cell and battery casings for organic electrolyte cells which are hermetically sealed.

It is another object of this invention to provide cell casings of rugged structure with high resistance to shock and vibration.

It is still another object of this invention to provide cell and battery casings of great simplification and consequently having high reliability.

It is a further object of this invention to provide cells of simple design to eliminate weight structures and to provide, consequently, high volumetric and gravimetric energy density.

These objects are achieved by the present invention which provides a case comprising a container and a cover therefore, which case encloses the electrodes, electrolyte and associated separator system leads and terminal connections for the electrochemical system. The cover is hermetically fastened to the container by welding, fusing or similar joining systems which will provide hermetic sealing of the cover to the container. The cover is provided with terminals for leading the generated electricity from the inside of the casing to the outside of the casing, and is also provided with an electrolyte filling portal which is provided with a novel fused seal which is a further hermetic closure for the casing. With regard to the terminals at least one and preferably both terminals are insulated from the casing and cover. The closure for the electrolyte filling port comprises preferably a nut with the female-threaded portion defining an opening in said cover and containing a resilient primary sealing means along the internal threaded portions of the nut. The nut and the resilient primary sealing means are chosen from materials which are resilient and inert to the electrolyte of the electrochemical generator system. The resilient primary sealing means is provided along a major portion of the internal surfaces of the female-threaded and primarily at least along the threaded portion adjacent to the interior of the case. The closure of this electrolyte filling portal is provided by a male-threaded member adapted to fit said female-threaded portion and to sealingly engage the resilient primary sealing means particularly at its lower portion and being fusingly sealed at its upper portion to the outer surface of the portal defining member or nut to close and provide a secondary seal for said electrolyte filling port. The fusibly sealed upper portions are provided by soft solder along the upper portions of the male-threaded member.

The invention will be more fully described in conjunction with the drawing in which.

Figure 1:
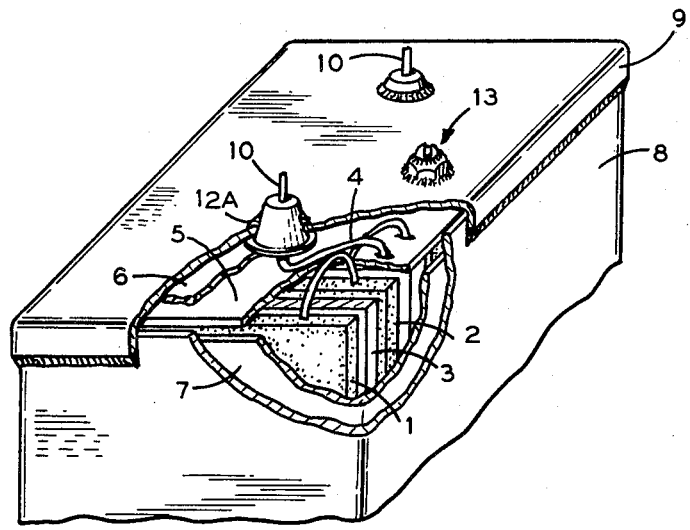
FIG. 1 is a perspective view of the upper portion of an hermetically sealed battery according to this invention with portions cut away to show the interior structure of the cell assembly.

As seen in FIG. 1, the cells were constructed in parallel plate configuration using depolarizer cathodes 1, and active metal anodes 2, connected in parallel, and one layer of filter paper 3 as separator and electrolyte absorber placed between each anode and cathode assembly. The inter-connection between the cathodes 1 and between the anodes 2 was accomplished by spot welding the tabs 4 coming from each electrode. A layer of filter paper 5 with suitable openings for the tabs was placed over the stack in order to insulate the tabs from the electrodes which are placed beneath the tabs 4. Another layer of filter paper 6 with two suitable openings was placed above the cathode and anode terminal tabs for additional protection against accidental shorting.

Figure 2:
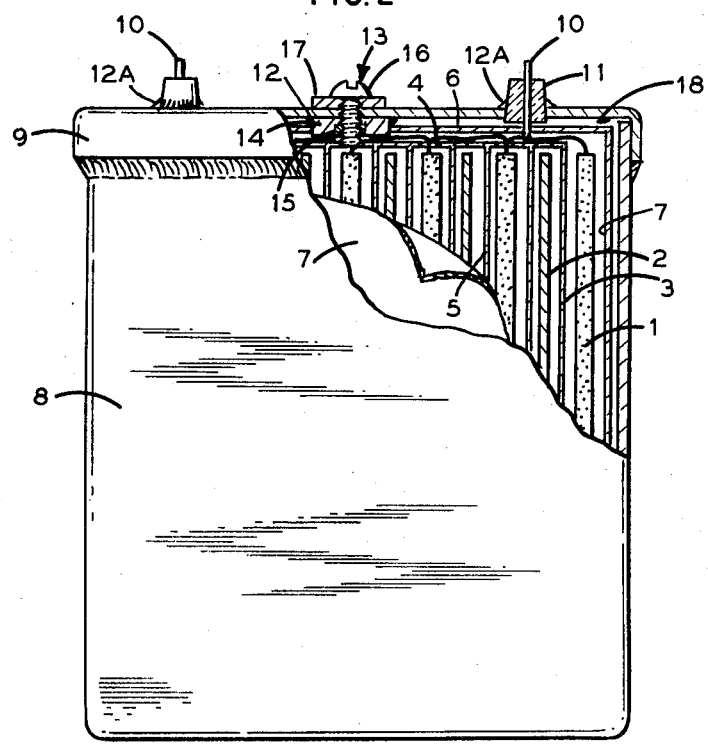
FIG. 2 is a side veiw of a battery casing according to this invention, with parts cut away to show the internal arrangement of the components and showing in section the sealed portal for introducing the electrolyte.

The cell stacks was then packaged in a bag 7 made of cellulosic material, such as filter paper, but which also could be made of fluorinated hydrocarbon materials. This bag 7 provided electrical and mechanical insulation of the cell components from the metal container 8. Metal container or casing 8 used for the cell was a rectangular brass can with a brass cover or lid 9, which was fitted with cell terminals and had an electrolyte filling port. A sectional view of the cell showing details of the cell terminals 10 and the electrolyte fill port and its closure 13 is shown in FIG. 2. The cell terminal assemblies 10 were made of glass 11-to-metal 12 Kovar seals which are known to provide a hermetic seal. The terminals were soldered at 12a to the lid 9 with silver solder.

Figure 3:
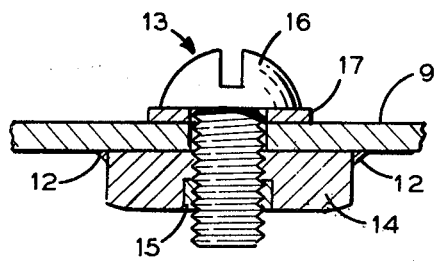
FIG. 3 is an enlarged section showing details of the closure of the electrolyte introducing portal of FIG. 2 with details of the double sealing structure.
Figure 4:
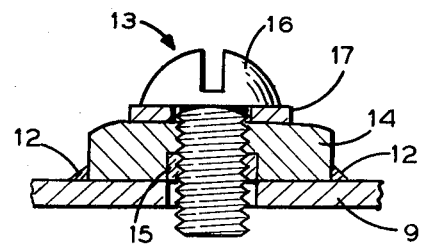
FIG. 4 is another enlarged section of the electrolyte introducing port similar to FIG. 3 but showing a variant structure thereof.

The electrolyte fill port closure consisted of a threaded brass nut 14 soldered to the lid with silver solder. In the embodiment of FIG. 1 and FIG. 4 the threaded brass nut 14 is on the upper or outer surface of the lid. In the embodiment of FIG. 2 and FIG. 3 the threaded brass nut 14 is soldered to the inner surface of the lid. Preferably this soldered (joining) is accomplished with silver solder. The threads of the nut were precoated with a layer of silver solder 15 to provide a resilient thread-engaging seal along the inner surface of the female-threads of the nut 14. The inner surface of the cover or lid 9 was insulated with a film of fluorinated hydrocarbon 18 except in areas to be soldered.

The assembly of the battery was accomplished in the following manner: the cell stack was placed in the brass container and the cathode and anode tabs 4 were spot welded to the cell terminals 10 on the brass lid 9. The lid was then closed and soldered to the brass can or container 8 with soft solder. This operation was preferably carried out in a dry box in order to isolate the electrodes from moisture. Most of the active metal anodes are particularly sensitive to moisture, and exposure to moisture should be avoided.

The electrolyte, non-aqueous organic electrolyte was injected to the cell stack through the electrolyte filling-portal using a hypodermic syringe. The cell was maintained in the dry box with the fill port open for at least a half an hour in order to let any undisplaced trapped gas or air bubbles to escape from the cell container. Gas displacement could be accelerated by varying the pressure within the dry box. By varying the pressure from ambient to slight vacuum, the bubbles were more rapidly freed from entrapment along the separator and diffused from the container via the electrolyte filling-portal. The additional electrolyte was then injected into the cell. The electrolyte-portal closure was then effected by a brass threaded bolt 16 with a soft solder washer 17, which was then screwed into the brass nut 14, which had the silver solder 15 coated female-threaded. The male-threads of brass bolt 16 cut into the solder coating 15 on the female-threads of nut 14, thus providing a primary seal. This provision for a primary seal was very important, as the direct soldering of bolt 16 to brass nut 14, via soft solder washer 17 resulted in boiling and pressure buildup of the organic solvent electrolyte. This pressure buildup caused removal of some of the molten solder from washer 17, before it could solidify, thus making a channel for leakage. By providing the primary seal wherein the threads engaged in a resilient high boiling material such as silver solder, this channeling which caused leakage could be prevented. This primary seal can also be accomplished by a number of other methods that provide a resilient thread engaging seal, such as the use of temperature-resistant gasket or tape at the lower portions of the female-thread of brass nut 14, instead of the silver solder.

The final sealing of the cell was accomplished by the rapid heating of the junction between brass bolt 16, and soft solder washer 17. The soft solder melted and soldered the bolt to brass lid 9 or (2) to in FIGS. 2 and 3 or to the nut 14 in the embodiment of FIGS. 1 and 4.

As can be seen the present invention provides for a metallic casing which is hermetically sealed for protecting batteries and cells based upon active metal organic electrolyte systems. The advantages of hermetically sealed cells is easily apparent when one considers that the anodes are active metals which are easily decomposed by the presence of moisture. Further, hermetic seals are particularly useful inasmuch as some of the more commonly used and preferable electrolytes for organic electrolyte systems may be quite toxic.

It is advantageous to have hermetically sealed battery casings, wherein the battery casings are made of materials which are fuseable in order that the lid may be joined to the container by either a fusion process or a glueing process provided that the joining means is resistance to the electrolyte. The casings may be either metallic or non-metallic.

Various polymeric substances may be used for providing such casings, provided they are inert to the electrolyte used in the cell system. In addition to the brass disclosed in the preferred metallic embodiments discussed above, the cell containers may be made of nickel-coated aluminum, aluminum, and other metals which are resistant to the electrolytes used in such non-aqueous organic electrolyte systems.

This invention is applicable to all battery systems which are intrinsically non-gasing in nature.

What is claimed is:

1. A case for non-aqueous electrolyte electrochemical generator systems comprising a container and a cover therefore, said case enclosing the electrodes, electrolyte and associated separators, leads and terminal connectors for said electrochemical generator systems, and said cover being provided with terminals and an electrolyte filling-portal; said terminals being connected to the electrodes of said electrochemical energy generating system, at least one terminal being insulated from said cover; and the electrolyte filling-portal comprising a female-threaded portion defining an opening in said cover and containing a resilient primary sealing means, resistant and inert to the electrolyte of said system, at least at the threaded portion adjacent to the internal portion of said case and an electrolyte filling-portal closure means comprising a male-threaded member fitting into said female-threaded portion and sealingly engaging said resilient primary sealing means at least at its lower portion and being fusibly sealed at its upper portion to the outer surface of said cover to close and provide a secondary seal for said electrolyte filling-portal, said cover being hermetically sealed to said container to close said casing.

2. The case, as claimed in claim 1, wherein said female-threaded portion is sealingly fastened to the inner surface of said cover member.

3. The case, as claimed in claim 1, wherein said female-threaded portion is sealingly fastened to the outer surface of said cover.

4. The case, as claimed in claim 1, wherein said resilient primary sealing means is silver solder.

5. The case, as claimed in calim 1, wherein the resilient primary sealing means is a temperature-resistant tape.

6. The casing as claimed in claim 1, wherein said resilient primary sealing means is a temperature-resistant gasket.

7. The case as claimed in claim 1, wherein the cover is sealed to the container by fusion.

8. The case as claimed in claim 1, wherein the cover is sealed to the container by gluing or cementing.

(References on following page)

References Cited

UNITED STATES PATENTS

| | | | |
|---|---|---|---|
| 3,031,517 | 4/1962 | Peters | 136—133 |
| 3,109,552 | 11/1963 | Miller | 220—39 R |
| 3,489,266 | 1/1970 | Miller | 136—133 |
| 3,540,929 | 11/1970 | Carson | 136—179 |

FOREIGN PATENTS

| | | | |
|---|---|---|---|
| 380,561 | 9/1932 | Great Britain | 136—162 |

DONALD L. WALTON, Primary Examiner

U.S. Cl. X.R.

136—166, 170; 220—39 R